(12) United States Patent
Bolta et al.

(10) Patent No.: US 11,100,457 B2
(45) Date of Patent: Aug. 24, 2021

(54) VENUE MAP BASED SECURITY INFRASTRUCTURE MANAGEMENT

(71) Applicant: HERE Global, B.V., Eindhoven (NL)

(72) Inventors: Predrag Bolta, Berlin (DE); Jan Munther, Berlin (DE)

(73) Assignee: HERE Global B.V., Eindhoven (NL)

( * ) Notice: Subject to any disclaimer, the term of this patent is extended or adjusted under 35 U.S.C. 154(b) by 379 days.

(21) Appl. No.: 15/982,156

(22) Filed: May 17, 2018

(65) Prior Publication Data
US 2019/0354921 A1 Nov. 21, 2019

(51) Int. Cl.
| | |
|---|---|
| *G06Q 10/08* | (2012.01) |
| *H04W 4/33* | (2018.01) |
| *G06Q 10/06* | (2012.01) |
| *H04W 4/021* | (2018.01) |
| *G06F 16/29* | (2019.01) |

(52) U.S. Cl.
CPC .......... *G06Q 10/087* (2013.01); *G06F 16/29* (2019.01); *G06Q 10/06* (2013.01); *H04W 4/021* (2013.01); *H04W 4/33* (2018.02)

(58) Field of Classification Search
CPC ....... H04W 4/021; H04W 4/33; H04W 12/08; G06Q 10/06; G06Q 10/087; H04L 63/10; G06F 16/29
USPC ...................................................... 705/28–30
See application file for complete search history.

(56) References Cited

U.S. PATENT DOCUMENTS

| | | | | |
|---|---|---|---|---|
| 5,307,295 A | * | 4/1994 | Taylor ................... | H05B 47/12 703/1 |
| 6,804,624 B2 | * | 10/2004 | Silverman .............. | H04L 41/12 702/159 |
| 6,859,768 B1 | * | 2/2005 | Wakelam ............... | G06Q 10/06 703/1 |
| 7,092,014 B1 | * | 8/2006 | Li ........................ | H04N 13/279 348/218.1 |
| 7,308,703 B2 | * | 12/2007 | Wright .................. | G06F 21/32 726/1 |
| 7,739,138 B2 | * | 6/2010 | Chauhan ............... | G06Q 10/06 705/7.14 |
| 8,026,814 B1 | * | 9/2011 | Heinze .................. | G06Q 10/06 340/572.1 |

(Continued)

FOREIGN PATENT DOCUMENTS

WO 2016154311 A1 9/2016

OTHER PUBLICATIONS

NuSIM™ 3d Visualization Real-time Physical Security, Camera Networks, Motion Sensors, Fire Alarms, Etc. (http://www.nupsys.com/nusim.html) accessed: May 1, 2018.

(Continued)

*Primary Examiner* — Andrew Joseph Rudy
(74) *Attorney, Agent, or Firm* — Lempia Summerfield Katz LLC

(57) ABSTRACT

Systems and methods are provided for identifying an acceptable location for storing an asset in a venue. One or more security requirements for the asset are identified. A plurality of locations in a venue map database that satisfy one or more of the security requirements are identified. One or more security settings of a location are adjusted to satisfy the one or more security requirements. The location for storage of the asset is indicated on a venue map graphical user interface.

18 Claims, 8 Drawing Sheets

(56) References Cited

U.S. PATENT DOCUMENTS

| | | | | |
|---|---|---|---|---|
| 8,321,302 | B2 * | 11/2012 | Bauer | G06K 7/0008 |
| | | | | 705/28 |
| 8,370,224 | B2 * | 2/2013 | Grewal | G05B 19/05 |
| | | | | 705/29 |
| 8,386,766 | B2 * | 2/2013 | Nylander | H04L 65/1016 |
| | | | | 713/151 |
| 8,391,893 | B2 * | 3/2013 | McNamara | H04W 4/14 |
| | | | | 455/456.2 |
| 8,593,688 | B2 * | 11/2013 | Simske | G06K 19/06103 |
| | | | | 358/1.9 |
| 8,793,147 | B2 * | 7/2014 | Bradshaw | G06Q 40/08 |
| | | | | 705/4 |
| 8,849,618 | B2 | 9/2014 | Scrafford et al. | |
| 8,886,217 | B2 * | 11/2014 | Reitter | H04W 4/30 |
| | | | | 455/456.1 |
| 9,171,171 | B1 * | 10/2015 | Deb | H04L 63/20 |
| 9,179,232 | B2 * | 11/2015 | Jarske | H04S 7/303 |
| 9,262,604 | B2 * | 2/2016 | Kimbrell | H04M 1/673 |
| 9,262,763 | B2 * | 2/2016 | Peter | G06Q 30/02 |
| 9,300,645 | B1 * | 3/2016 | Rao | H04L 63/105 |
| 9,576,166 | B2 * | 2/2017 | Burch, V | G06K 7/10732 |
| 9,613,546 | B2 * | 4/2017 | Coroy | G01C 21/3682 |
| 9,628,506 | B1 * | 4/2017 | Han | H04L 63/145 |
| 9,659,419 | B2 * | 5/2017 | Suh | H04W 12/08 |
| 9,665,433 | B2 * | 5/2017 | Grewal | G06F 3/0482 |
| 9,679,038 | B2 * | 6/2017 | Omansky | G06F 16/27 |
| 9,720,555 | B2 * | 8/2017 | Sorden | G06F 30/20 |
| 9,805,192 | B1 * | 10/2017 | Gates | G06F 21/562 |
| 9,898,862 | B2 * | 2/2018 | Bhattacharya | G06T 19/003 |
| 10,025,463 | B2 * | 7/2018 | Shearer | H04L 12/2803 |
| 10,068,377 | B2 * | 9/2018 | Sisbot | G06T 19/006 |
| 10,102,507 | B2 * | 10/2018 | Buchbinder | G06Q 10/20 |
| 10,139,792 | B2 * | 11/2018 | Schmitt | G05B 15/02 |
| 10,176,514 | B1 * | 1/2019 | Chen | G06Q 30/0201 |
| 10,181,173 | B1 * | 1/2019 | Wilt | G06T 1/20 |
| 10,263,998 | B1 * | 4/2019 | Bhatt | H04L 63/1416 |
| 10,417,592 | B2 * | 9/2019 | Byk | G06Q 10/06315 |
| 10,467,617 | B1 * | 11/2019 | Moshfeghi | G06Q 20/20 |
| 10,522,043 | B2 * | 12/2019 | Chu | G06Q 10/047 |
| 10,530,782 | B2 * | 1/2020 | Brockhuus | H04W 12/08 |
| 10,540,685 | B2 * | 1/2020 | Carroll | G06Q 30/0255 |
| 10,810,571 | B2 * | 10/2020 | Todasco | G06Q 20/382 |
| 10,852,921 | B2 * | 12/2020 | Kennedy | G06F 3/04842 |
| 2005/0131658 | A1 * | 6/2005 | Mei | G06T 19/00 |
| | | | | 703/1 |
| 2005/0131659 | A1 * | 6/2005 | Mei | G06T 17/10 |
| | | | | 703/1 |
| 2008/0062167 | A1 | 3/2008 | Boggs et al. | |
| 2008/0180218 | A1 * | 7/2008 | Flax | G16H 40/20 |
| | | | | 340/10.1 |
| 2017/0090441 | A1 | 3/2017 | Schmitt et al. | |
| 2018/0040038 | A1 * | 2/2018 | Vanslette | H04W 4/02 |
| 2020/0120170 | A1 * | 4/2020 | Amitay | H04L 41/28 |

OTHER PUBLICATIONS

Simon Seibt et al., "3D Modeling of Selected Assets, Security Zones and Conduits," Nuremberg Institute of Technology; Department of Computer Science, Lecture Notes in Informatics (LNI); INFORMATIK 2016.

Stuart Rich et al., "Geographic Information Systems (GIS) for Facility Management," IFMA Foundation, Aug. 2010.

Youssef Ahres et al. "Real-Time Dense Map Matching with Naive Hidden Markov Models: Delay versus Accuracy," Stanford University, Dec. 2014.

* cited by examiner

VENUE MAP BASED SECURITY INFRASTRUCTURE MANAGEMENT

FIELD

The following disclosure relates to mapping and location services.

BACKGROUND

Venue maps provide an overview of different indoor and outdoor environments and allow for positioning of different devices within the venue maps. Building security systems provide solutions to secure assets, protect people, and lower operating costs. Large venues may include complex security systems due to variable security requirements. Security requirements may include, for example, identifying and controlling individuals who enter and exit the venue, tracking movements of building occupants and assets, controlling access to restricted areas, tracking and locating equipment, products, and other resources, among other requirements.

In order to manage the requirements, venues may implement different mechanisms such as camera surveillance systems, access control systems, electronic locks further restricting access to secure areas, watchman routes, safes, fire safety equipment, etc., each of which may be configured to provide a certain level of protection for specific use cases. However, some areas inside the venue may not include all of the features due to regulations, costs, or other factors. Some areas may not allow certain features due to public access, privacy concerns, or other factors. As such, security settings and levels may vary across a venue from area to area. Even in a single room, different areas in the room may present different security issues due to line of sight or electronic capabilities, for example. Management of assets and access is done primarily manually by checking different requirements or maps. Errors may occur due to the complexity of overlapping systems and requirements. Assets and personnel may be exposed to unsecure situations as a result.

SUMMARY

In an embodiment, a method is provided for identifying an acceptable location for storing an asset. One or more security requirements are identified for the asset by a processor. A plurality of locations are identified in a venue map database that satisfy one or more of the security requirements. The processor determines that none of the plurality of locations satisfy all of the one or more security requirements. One or more security settings of a location are adjusted to satisfy the one or more security requirements. The processor indicates on a venue map graphical user interface, the location for storage of the asset.

In an embodiment, a computer-readable, non-transitory medium storing a program that causes a computer to execute a method for identifying an acceptable location for storing an asset. A security requirements list is created for an asset. Areas are searched in a venue map that comply with the security requirements list. The areas are displayed the for storage of the asset.

In an embodiment, a system for identifying a location to store an asset. The system includes a graphical user interface, a venue map database, and a venue map analyzer. The graphical user interface is configured to select an asset and a plurality of security settings for the asset. The venue map database is configured to store security data and location data for a venue. The venue map analyzer is configured to search the database to identify locations in the venue for storage of the asset that comply with the plurality of security settings. The graphical user interface is configured to display the locations on a venue map generated from the venue map database.

BRIEF DESCRIPTION OF THE DRAWINGS

Exemplary embodiments of the present invention are described herein with reference to the following figures.

DETAILED DESCRIPTION

Embodiments described herein provide systems and methods for a comprehensive security review of an area inside a venue, under the perspective of which area complies with the security requirements of an asset. A venue map communicates with security systems to determine the security settings of different areas in a venue. Different venue maps security layers containing separate security features (e.g. tangible features such as assets, alarm sensors, access control systems, door locks, etc. and intangible features like surveillance camera coverage, access permissions etc.) are aggregated in a venue map. When a new asset is to be secured and stored in the venue, a security requirement list is created for the asset. The security requirements for the asset are inputted into a venue map analyzer that analyzes data in the venue map and searches for areas in the venue map complying with the security requirements. If no areas are found that comply with the security requirements, changes to security settings may be automatically made to provide a compliant area.

Venue and building managers may use various geographic, layout and asset tracking applications and software packages to create maps and databases that cover facilities or buildings. A user or operator such as a building manager may oversee the maps to make sure that everything is available, secure, and operating properly for building occupants to perform a manager's duties. Venue management may range from the small scale (e.g. single small building custodial services) to the large scale (such as a campus including many buildings) or even on an international scale (e.g., global service provision to a multinational corporation). As such, managing operations and security for facilities of varying scales entails use of various programs and packages to manage the assets. Locating a particular building or asset often requires use of architectural or space planning layouts to locate places or objects within the venue.

For large scale mapping, e.g. over a campus or including multiple buildings, interactive geographic information systems (GIS) may be used for locating an object or feature. Associating data with location allows for a user to analyze, correlate, and display the data. GIS may include an overlay of data layers on a base map layer. Layers may include visual map data such as images, infrared and radar data and various other information.

At the building level, various graphical office automation programs may be used to generate renderings of building layouts. Spreadsheet and relational database applications may include inventory assets that are assigned to the building layouts. Architectural software such as computer aided design (CAD) may be used to generate the maps that may be used for venue management. Venue floor plans may be oriented as a layer placed within GIS.

Figure 1:
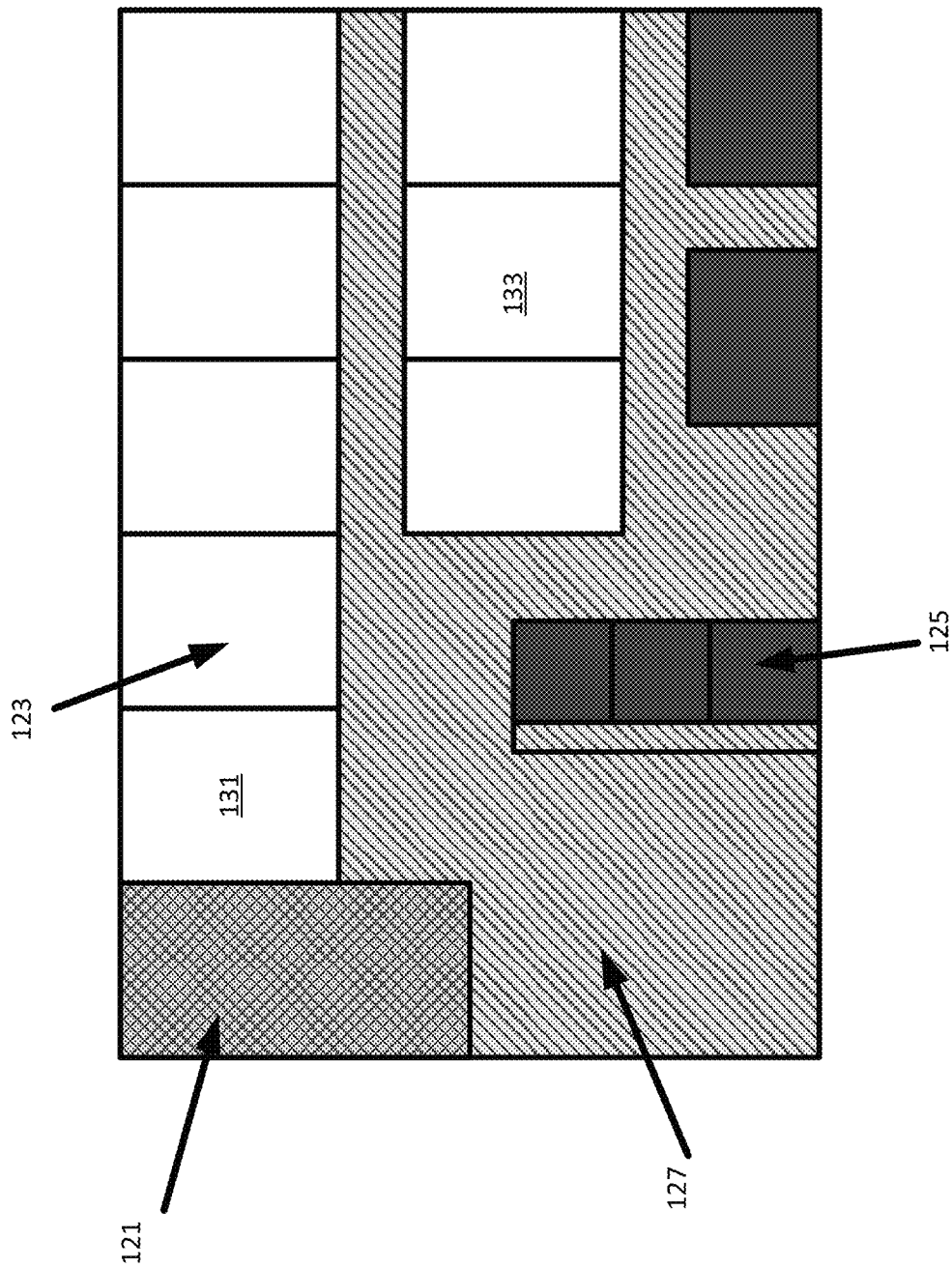
FIG. 1 depicts an example two-dimensional venue map.

Venue maps may be provided using simple two-dimensional maps or three-dimensional maps. FIG. 1 depicts an example two-dimensional map of a floor of an office building. The map of FIG. 1 may be generating using, for example, an CAD program or other building design software. The map of FIG. 1 includes four different security zones 121, 123, 125, 127. A first zone 127 represents the walkways between the rooms. A second zone 121 represents a conference room. The other two zones represent offices 123 and closet areas 125. The map and zones may be derived from a simple keycard system. A user may be given access to one or more zones which then allow a keycard to work on the door locks. A user may for example, have access to the general area 127 (keycard access to the front door), access to the conference room 121 (keycard access to the conference room door), and keycard access to an office 123. A supervisor may further have access to the closets 125 (for example that contain a server or paper files). One of the problems with the venue security map of FIG. 1 is the reliance on security zones. Each zone, for example, includes a different security designation that represents a bundle of security rights. When adding a new asset, for example, a printer, there are limited options for where to securely locate the printer as there are only four different security classifications. Further, areas within each zone classification may have varying levels of security. For example, a first office 131 may be much less secure than a second office 133 even though the offices 131, 133 are both in the same security zone 123. The first office 131 may be in the line of sight of the lobby, may have additional access through a window, may be next to a well trafficked conference room, may have a different level of wireless coverage than the second office 133, may not be close to a smoke alarm, and so on. However, both offices 131, 133 are assigned to the same security zone to simply the map for an operator to use manually.

Another drawback of the map of FIG. 1 is the inability to alter the security settings. The map of FIG. 1 may be a "dumb" map, e.g. there is not the ability to change setting by, for example, clicking on the map and adjusting a slider or a pull-down menu. Further, a simple map does not have the ability to validate that changes to features or functions will not affect other stored assets. For example, if the WIFI settings are changed for one zone (if even possible) the map is not configured to identify where and which existing assets would be affected. Each security system may be walled off from other security systems and as such, may not communicate or share information.

Embodiments provide a map management system integration that is configured to interpret and alter security settings to comply with asset security requirements. A venue map integrator is provided that communicates with security systems and stores security related data in a map venue database. A venue map analyzer is configured to search the map venue database to identify secure areas for storage of an asset. The analyzer may automatically change security setting using the integrator or may provide recommendations to a user for manual intervention.

The disclosed embodiments may be implemented to computationally facilitate processing security data, connecting disparate systems, locating an appropriate physical location for an asset, and consequently improving and optimizing venue management. Security of assets and venue may be improved. The disclosed embodiments lead to an improvement in the computational system, e.g. in the way that security data is communicated and shared between systems to find solutions that would otherwise be impossible due to the size and amount of data. The increased efficiency and usage of resources may lead to quicker implementation time, fewer errors, and as such, more secure operation of a venue.

Figure 2:
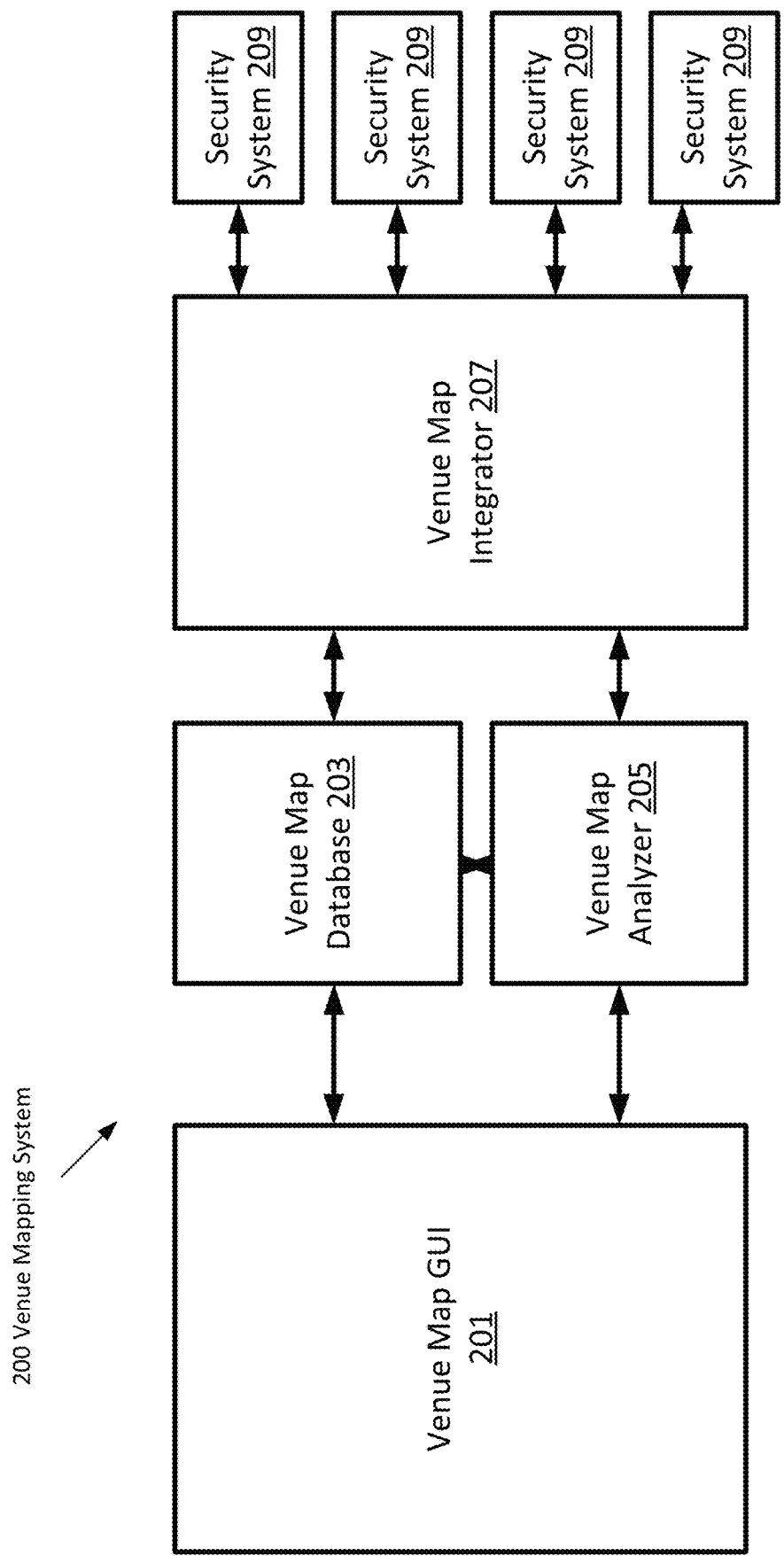
FIG. 2 depicts a venue mapping system according to an embodiment.

FIG. 2 depicts an example venue mapping system 200. The venue mapping system 200 includes a venue map database 203 that includes a plurality of security layers. The venue mapping system 200 further includes a venue map analyzer 205 and a venue map integrator 207. A graphical user interface (GUI) 201 may be included to present a visual map to a user. The venue map database 203 may be in communication though the venue map integrator 207 with one or more venue security systems 209. The venue security systems 209 may be security systems 209 that operate within the venue, for example, keycard systems, wireless systems, surveillance, and other security related systems. The venue security systems 209 may be third party systems that may be setup and operated independently. For example, a keycard system may be setup with its own proprietary server, software, and interface. A surveillance camera system may also be setup with its own proprietary server and interface that may be incompatible with the keycard system. The third-party security systems are contacted by the venue mapping system 200 via one or more connectors, which invoke calls into their networked Application Programming Interfaces (APIs) in order to propagate the modifications made. Each component may be co-located with the other processing nodes or may be remotely located. Additional, different, or fewer components may be included. The GUI 201 may be presented on display terminals or may be available over a network, for example, and display using a smartphone or handheld terminal. The venue map database 203 and component may be located onsite at the venue or may be stored in the cloud. Access to the venue mapping system 200 may be limited to building management in full or in part. Certain aspects may be provided to the public, for example, the publicly available areas of the venue such as the lobby, commercial areas, or restrooms for example.

Venue maps and other maps may be generated and stored by a map developer. The map developer may be a person, company, or entity that develops maps or obtains and maintains map data and/or a geographic database. The map developer may generate a routable map based on the generated venue map. The venue map may be part of a mapping system that includes a routable map of a roadway. The mapping system and/or a geographic database may store road segment data records and node data records. The road segment data records may represent links or segments representing roads, streets, or paths that may be used for determination of one or more routes. The node data records are points corresponding to the respective links or segments of the road segment data records. The road link data records and the node data records represent a road network, such as used by vehicles, cars, and/or other entities. Alternatively, for example, the map database may contain road segment and node data records or other data that represent pedestrian paths or areas in addition to or instead of the vehicle road record data.

A route may be selected by a user or generated by the mapping system. The route may contain road segments beginning at a starting point and ending at a destination. The starting point and destination may be entered or selected by a user. The mapping system may generate the route using the starting point and destination and any preferences (such as shortest distance or time). The route may include one or more waypoints in between the starting point and the destination. The road segments in the route may be ordered sequentially. The route may include routing instructions for navigating the venue or for placement of an asset. Automated commands and/or processes may be used in development of the routable venue. Alternatively, the creation or generation of the routable venue map may be substantially entirely automated. A user may use the routable map for routing, guidance, and/or navigation purposes regarding the building floors and interior/exterior spaces.

A venue map may include venue map security layers that contain data for separate security features (e.g. tangible features like assets, alarm sensors, door locks, etc. and intangible features like surveillance camera coverage, access permissions etc.). The venue map security layers are aggregated and stored in a venue map database 203. When a new asset needs to be secured in the venue, a security requirement list is created for the asset. The security requirements for the asset are submitted to a venue map analyzer 205 that analyzes venue map security layers and searches for areas in the venue map complying with the security requirements. Based on the search results, the venue map analyzer 205 proposes ideal areas for safekeeping of the asset. In case the venue does not have areas that comply with the requirement list, areas with the easiest to overcome non-compliance issues are determined by the venue map analyzer 205. The venue map analyzer 205 may automatically or manually make changes to the security settings to provide a location that complies with the requirement list. Once the changes, either automatic or manual, are performed, the venue map analyzer 205 may review the requirements again. The venue maps GUI 201 may display the location and other data for placement of the asset.

In an embodiment, an intelligent venue map is provided that includes an overview of one or more facilities. The intelligent venue map may be used to automatically determine the security conditions of different areas in a building. The intelligent venue map may also be used as a basis to navigate throughout the venue. The intelligent venue map contains the basic physical features of the building, e.g. walls, rooms, doorways, accessors, lifts, stairwells, etc., with the option of selecting the different floor levels available at the venue. The intelligent venue map may be integrated into a dashboard view, that may display additional information about the venue. An intelligent venue map may differ from a non-intelligent map in that the intelligent venue map may be updatable and may provide additional information and options beyond simple navigation services. An intelligent venue map may automatically change security setting due to changing circumstances.

The intelligent venue map may be generated (or rendered for viewing) with data stored in the venue map database 203. The venue map database 203 includes security layers that correspond to security settings. The layers may include data that corresponds to coordinates on an underlying venue map. Coordinate systems such as latitude, longitude, and altitude may be used to specify a location on the venue map. Other coordinate systems such as specifying pixels or voxels on the venue map may also be used. The coordinate systems may align with exterior systems for use in the global positioning system or may be relative to a location (point) in the venue. The security layers may include both tangible and intangible layers. Tangible layers may include layers that describe actual locations of physical assets or objects. Intangible layers may include layers that describe areas, permissions, or settings. Examples of tangible layers include layers for assets, alarms, doors, barriers, windows, access control panels/readers, safes, and other physical objects or features for a venue. Example of intangible layers include asset permissions, surveillance settings, and environmental settings among other features.

Figure 3:
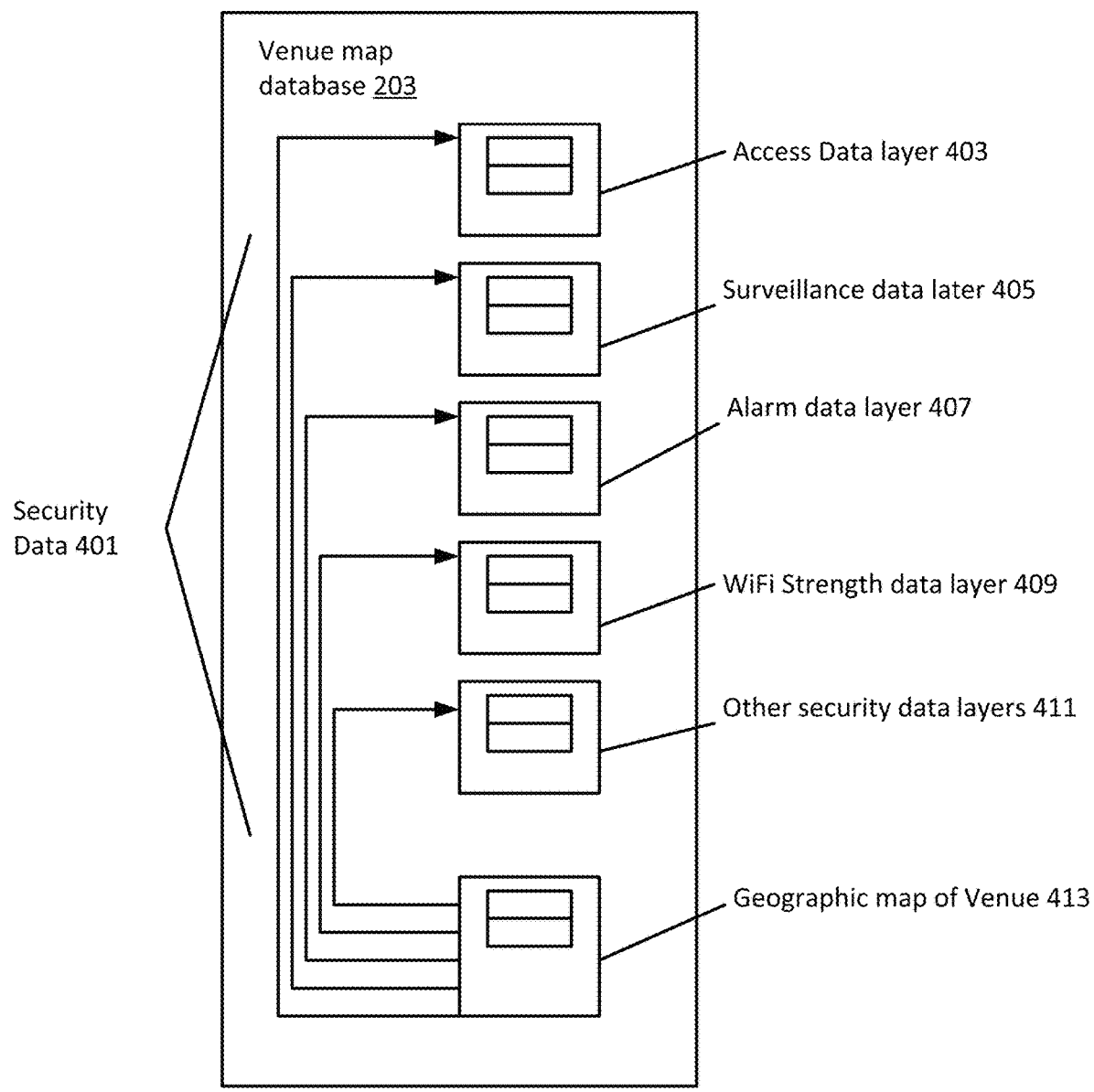
FIG. 3 depicts an example structure of a venue map database.

FIG. 3 depicts an example structure of the venue map database 203 for storing security data 401. The venue map database 203 includes multiple layers of data including but not limited to an access data layer 403, a surveillance data layer 405, an alarm data layer 407, a Wi-Fi strength data layer 409, and other layers 411. Each of the layers may be overlaid or correspond to coordinates, pixels (two-dimensional), or voxels (three-dimensional), in the geographic map of the venue 413.

In the asset layer, a record may be stored of where different assets recorded by the system (equipment, printers, prototypes, etc.) are kept in the building. Although larger objects will usually remain on one location, assets may also be tracked as the assets are moved within the building, with the asset's position updated via indoor/hybrid positioning methods.

In an alarm layer 407, the location and settings of different alarms or sensors may be stored. For example, some rooms may be equipped with motion sensors or vibration sensors that trigger alarms if movements are registered. A venue map security layer may provide an overview of where such sensors are located within a building and may highlight areas if an alert is triggered. The alarm layer may also include data for smoke alarms and/or sprinklers. Assets that may pose a fire risk should be located within reach of smoke alarms and sprinklers. Location and settings of such safety equipment should be recorded in a venue map security layer.

In a door locks/barriers layer 403, a record may be stored of where the doors exist in the building or venue. Traditional lock and key systems may be present in many facilities, some of them with single keys for a lock, others for keys with multiple access. In addition, locks using cardkeys or transponders may be deployed in a venue. As different systems provide different advantages as well as limitations, different security requirements may prefer the choice of one system over another.

In an access control panels and reader layer, a record may be stored of where the control panels and readers exist in the building or venue. A venue map security layer including position of access control panels and readers, may provide an overview of where the devices are located, how the devices are correlated and highlight area with different access control levels and authorization.

In a windows layer, data may be stored for windows or access points that may become unauthorized access entry points. Some windows may also be equipped with sensors that report them being open or even broken.

In a secure storage layers, data for safes and other secure storage apparatuses may be stored. Secure storage, for example in the form of safes, may be available in different areas of the venue, or a venue may be designated as a vault.

Besides the location information, the venue map security layer may also include information as to who has access to the safe or the vault.

In a utilities layers, data for power outlets, network outlets, antenna, water, heating ventilation, and cooling (HVAC), and other connectors may be stored. Some assets may require cabled power supplies, network connectivity or antenna connections to be operational. Even a water supply may be required.

The security layers that describe tangible features may be automatically or manually alterable by the venue security system. For example, objects or features in each of the layers may include multiple potential locations within the venue. Certain objects or features may be moved to satisfy security requirements of new assets or personal. For example, a smoke alarm may be movable between multiple locations to satisfy a security requirement. Additionally, a location may be designated as a possible location for a new smoke alarm if the need arises for a new asset. By storing different potential locations for the tangible features, the system provides options for the venue map analyzer 205 described below. In an embodiment, the tangible feature data may be discovered using the venue map integrator 207. The tangible feature data may be input manually into the system.

The tangible features may also include non-tangible settings such as access control and coverage. Other venue map security layers may also describe and include data for non-tangible features of the venue. Non-tangible features may include features such as access permissions, surveillance camera coverage, wireless network connectivity, function designations of space, insurance or regulatory conditions, line of sight, environmental levels, traffic levels, among other intangible features. Non-tangible features, like tangible features, may be stored in layers in the venue map database 203. A user or operator may be able to view or access each layer individually or overlay layers on top of one another in a GUI.

In an access permissions layer 403, access permissions to areas may be stored. Access permissions to one area may be managed in connection with keycard/transponder systems. While some areas of a building may be accessible to every keycard/transponder holder, other areas may be restricted to certain individuals. An access permission layer may reveal who has access to a specific area or who controls the access permission list for said area. The venue map integrator 207 may communicate with a keycard system to receive and push updates the system. In an example, a new user may be added to an access list for the venue in the venue mapping system 200. The venue map integrator 207 may identify the appropriate access and push the user id and the access levels to the keycard system for implementation. The access of the user may also be cross checked with existing asset storage and access to identify any security risks.

In a surveillance layer 405, data for coverage areas for surveillance may be stored. Surveillance cameras may provide a certain coverage of areas of a building. While having the location of the tangible camera asset on a layer of the map is useful, the area which is covered by the camera view is important to determine what is and what is not within range of the camera. The camera may be fixed, able to rotate or even move freely around the building (e.g. mounted on a drone or a robot). Data for other types of surveillance coverage may also be stored such as audio or electronic monitoring.

In a wireless network connectivity 409, data is stored that relates to the availability or strength of a wireless connection. Areas of the building may have access to an internet connection, a cellular phone connection, Bluetooth connection or some other wireless communication technology. Some applications may require that the asset is connected to the internet, while others may insist that there is no wireless connectivity available. The Wireless Network Connectivity layer may offer information of signal strength for 2G, 3G, LTE, Wi-Fi, BT, etc.

In a functional designation layer, data is stored that relates to the function of a space. Some spaces in the building may be designated as private space, work space, meeting rooms, storage, server rooms, sanitary facilities, etc. Given local regulations, there may be spaces that have specific requirements, and may not allow certain modes of security. For instance, Germany prohibits camera surveillance on designated work spaces, while also making access to a natural light mandatory.

In a regulatory/insurance layer, data is stored that relates to regulations or insurance conditions. Some areas of the building may be subject to different policy conditions, where it is allowable or not allowable to store/locate different assets, depending on an insured value or regulations associated with the asset (e.g. chemicals may have some restrictions as to quantity or location).

In an environmental layer, data is stored that relates to noise, temperature, or other environmental features. Some assets may require a quiet environment, some a climate-controlled environment. Noise and temperature levels for locations may be stored in the environmental layer. Measurements about such conditions on a room may be collected into one venue map security layer.

In a traffic layer, data is stored that relates to a traffic level for an area. Some applications may require a less transited environment, not only to avoid noise, but also to avoid the possibility of exposing an asset to view or to it being stolen. The traffic layer may include traffic statistics for areas over time. Traffic may be determined using systems such as surveillance, key card readers, scheduling applications, or other methods. In addition to regular traffic levels, the traffic layer may also include specific routes taken by security personal. For example, a record may be kept on a layer of how security personnel patrol the venue, determining if and when different areas will be visited during rounds.

Additional data may be derived from the physical layout of the venue. For example, line of sight for areas may be identified based on the layout of walls, windows, cubicles, or other features. Some security requirements may insist on obscuring an asset from the line of sight of the public. While this may be rather obvious for spaces adjacent to exterior windows, floor height as well as obscured/tinted glass may achieve the same effect. Areas where a line of sight from an adjacent area does not exist, may be designated as such.

The venue map database 203 may interact with a geographic map. A geographic map may provide routing or navigation information for navigation devices such as smartphones or autonomous vehicles. The venue map database 203 may be public, private, or a combination of both public and private. For example, a public terminal may be able to access the venue map database 203 to determine which areas are off limits while not making available other security information. Geographic maps may also access the venue map database 203 to augment publicly available routing systems.

The venue map database 203 may include different map databases or different layers for different venues. In an example, a multinational company may have multiple venues across the globe. Each venue may store its own venue map database 203. Alternatively, the venue map database 203 may be centrally located or stored in the cloud for each venue to access. In operation, the different venue maps may be selected in a menu, for example, on the venue map GUI 201.

The venue map GUI 201 may overlay the security features of the venue on top of a two dimensional or three-dimensional venue map so that a user may interact with different features of different venue systems on top of a single interface. The venue map GUI 201, e.g. in a management dashboard mode, may provide a series of controls to create, read, update and delete (CRUD) information on the individual venue security systems 209, by accessing the venue security systems 209 via the API, provided that the GUI user possesses valid access credentials to the venue security system(s). The venue map GUI 201 may be access though a terminal or through a handheld device such as a smartphone or tablet device.

The individual venue systems may be integrated into the venue map database 203 and venue map GUI 201 using a venue map integrator 207. The venue map integrator 207 may be configured to communicate with security systems 209 installed at or for the venue. The communication may be bi-directional. For example, the venue map integrator 207 may parse the security systems 209 and extract data for inclusion in the venue map database 203. In an example, the venue map integrator 207 may identify locations and settings of sprinklers in a fire security system. The locations and settings may be added to the venue map database 203 in one or more layers. The venue map integrator 207 may also transmit commands or requests for changes to the security systems 209. For example, the venue map integrator 207 may request that access permission be changed for a door.

The venue map integrator 207 communicates with the venue systems via APIs or other suitable connectors (for legacy systems, file export/import may serve as a transaction medium). The venue map integrator 207 may identify the locations and settings of different security features of the different security systems 209. The locations for the security features are extracted from the venue security system(s) and matched to the locations on the venue map. Once the matching is performed, layers for each venue system may be generated, added to the venue map database 203, and provided on the venue map GUI 201. The venue map integrator 207 communicates with the different security systems 209 using a connecter, for example a customized API.

In an example, the venue map integrator 207 may communicate with a security system that identifies a location of where different assets are kept in the building. The security system, for example, may use scanning barcode labels attached to the assets or by using tags using GPS or RFID that broadcast a location of the asset. The asset tracking security system may track assets in real time. The venue map integrator 207 may communicate with the asset tracking security system to locate asset or provide new assets to be tracked.

In an example, the venue map integrator 207 may communicate with a security system that maintains settings of different alarms or sensors. The alarm security system may manage when and how alarms are triggered. The venue map integrator 207 may communicate with the alarm tracking security system to locate the alarms and adjust setting.

In an example, the venue map integrator 207 may communicate with a security system that maintains access control panels and readers layer. The access control panel/reader security system may include locations and provide settings or permissions for access control panels and readers. The venue map integrator 207 may communicate with the access control panel/reader security system to alter permission or access.

In an example, the venue map integrator 207 may communicate with a security system that controls one or more utilities, e.g. data for power outlets, network outlets, antenna, water, heating ventilation, and cooling (HVAC) among others. The venue map integrator 207 may provide a connector for the venue mapping system 200 to make environmental changes though the utilities security system. For example, the venue mapping system 200 may communicate with a HVAC system using an API to change the heating or cooling of an area to comply with an asset security requirement.

In an example, the venue map integrator 207 may communicate with a security system that controls access permissions to areas. Access permissions may be thus managed by the venue mapping system 200 using an API to connect to the access permission security system (e.g. a keycard/transponder system). The venue map integrator 207 may communicate with a keycard system to receive and push updates the system. In an example, a new user may be added to an access list for the venue in the venue mapping system 200. The venue map integrator 207 may identify the appropriate access and push the user id and the access levels to the keycard system for implementation. The access of the user may also be cross checked with existing asset storage and access to identify any security risks.

In an example, the venue map integrator 207 may communicate with a surveillance system. For example, cameras may be able to rotate or even move freely around the building (e.g. mounted on a drone or a robot). The venue map integrator 207 may use a connecter to allow the venue mapping system 200 to communicate instructions to individual cameras or sensors, for example changing the field of view of a camera. Similarly, the surveillance system may provide information to the venue mapping system 200 using the connecter (e.g. API).

In an example, the venue map integrator 207 may communicate with networking equipment. The venue map integrator 207, for example, may communicate with a router or switch using an API to turn off or on a connection to a network. The venue map integrator 207 may communicate with a wireless router to change wireless channels, increase or decrease strength, or deny/grant access.

The connectors of the venue map integrator 207 may be provided by the venue mapping system 200 or by the security systems. The venue mapping system 200 may publish an API so that security systems may design products that can connect to the venue mapping system 200. Similarly, the security systems may publish an API so the venue mapping system 200 may communicate with the security system. In an embodiment, the venue map integrator 207 stores and maintains the connectors (APIs). Alternatively, the connectors may be stored and maintained by the venue map analyzer 205 or venue map database 203.

A location for a new asset may be requested by user input on the venue map GUI 201 or automatically requested, for example, when the new asset is delivered. The venue mapping system 200 includes a venue map analyzer 205 that is configured to identify optimal location(s) for the new asset given security requirements. The security requirements for the new asset are identified and submitted to the venue map analyzer 205. The security requirements may already be encoded with the new asset or entered manually by a user. In an embodiment, the venue map system may automatically assign security requirements based on previously received assets. For example, when a new printer arrives, the venue map system may assign the new printer the same security requirements that a previously received printer was assigned. The venue map database 203 may store the security requirements for each asset or asset class. Templates for different asset classes may be stored to facilitate storage of a new asset. The venue map database 203 may be connected to outside systems through the venue map integrator 207 to identify the security requirements. In an example, the venue map integrator 207 may receive and update security requirements in the venue map database 203 for existing or new assets if, for example, an update is published by a security system. A security hole, for example, may be discovered for an asset. The venue map integrator 207 may receive an update or a suggest security settings change from the manufacturer of the asset and take appropriate action (automatically or by prompting an operator).

In an embodiment, the venue map analyzer 205 analyzes the venue map security layers in the venue map database 203 and searches for areas that comply with the security requirements list for the asset or object. The venue map analyzer 205 is configured to iterate though all the different layers in the venue map database 203 and to determine which areas fulfil each of the criteria defined by the security requirements list. Further iterations are made for each of the requirements, until the relevant set of areas is reduced to the ideal candidates. The resulting set of areas may be presented to the operator of the GUI, who may in turn decide which of the candidate areas is the preferred area. Alternatively, the venue map analyzer 205 may automatically select an area and direct storage of the asset.

In an embodiment, the venue map analyzer 205 may be configured to identify location for multiple assets at the same time. The interplay between the assets and requirements may be taken into consideration when selecting locations. For example, the venue map analyzer 205 may be able to determine location for each of the assets together rather than identifying a location for each in turn (which may lead to the last assets not being assigned a location). Locating multiple locations for multiple assets may require shuffling around existing assets or changing security settings to accommodate each and every asset in the group.

In case the venue does not have any areas that comply with the requirement list, the venue mapping system 200 may identify which areas are the easiest for overcoming non-compliance issues. Areas that are the easiest to overcome non-compliance issues may include settings that may be automatically adjusted without affecting other asset security requirements. Areas that are the hardest to overcome non-compliance issues may require manual intervention and/or movement of one or more existing assets. Different algorithms may be used to determine the easiest area to overcome non-compliance. The complexity of the security requirements and how easy it is to alter the settings of a security system or move other assets may be taken into consideration. Locations in the venue may have variable settings that may be automatically changed or altered to accommodate storage of a new asset. The venue map analyzer 205 may be configured to alter or change security setting for one or more features to provide a location that meets the security requirements of one or more assets. The venue map analyzer 205 may issue setting changes to elements of the venue systems automatically such as adjusting Wi-Fi strength, thermostat settings, access permissions, watchman routes or alarm conditions (e.g. changing the timing on the alarms), as long as the system is authorized to perform such changes. The alterations or setting changes may be communicated through the venue map integrator 207. Each alteration may be made with consideration given to assets already stored in the venue. For example, the venue mapping system 200 may change access permissions automatically for a room to generate an acceptable location for a new asset, but only if the change to the access permission maintains the security requirements of existing assets already located in the room. If there are no areas that comply with the requirement list, the analyzer may present options to the user for manually adjusting or overriding security settings or moving assets.

In an embodiment, the new asset may already have a location selected. In an example, a new workstation for a new employee may be acquired. The location of the new workstation may already be selected (for example, an existing cubicle). In this scenario, the security analyzer does not have to identify a location. Rather, the security analyzer may verify that the location complies with any security requirements. If not, the security analyzer may adjust (if possible) security settings so that the preselected location is valid. Additionally, the new location of the asset and the security settings may be stored in the venue map database 203.

When an asset is removed, the security analyzer may automatically identify any impact the removal has on other assets or security settings. Removal of, for example, an access door may affect not only the room behind the door but also other assets in the vicinity, the foot traffic for the area, environmental features, and other security settings. The security analyzer may determine if any security settings or features should be altered or if any locations may not comply with security requirements for any existing assets.

Figure 4:
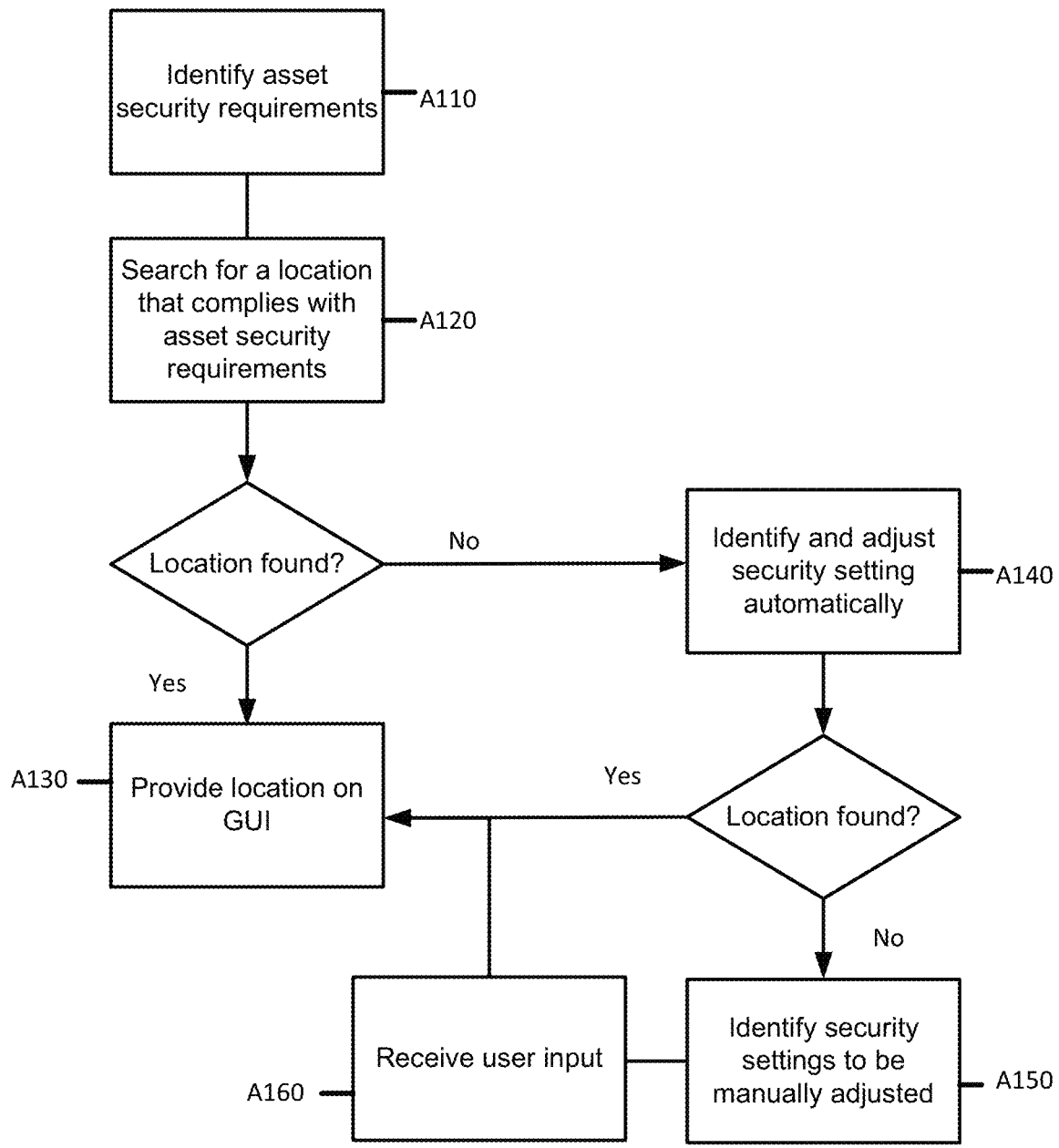
FIG. 4 depicts a flowchart for identifying an area for placement of an asset in a venue.

FIG. 4 depicts a workflow for identifying areas to store an asset in a venue that requires a certain level of security. An asset is presented that requires a level of security. The venue map analyzer 205 analyzes venue map security layers and searches for areas in the venue map database 203 complying with the security requirements. As presented in the following sections, the acts may be performed using any combination of the components indicated in FIG. 2. The following acts may be performed by the venue map analyzer 205, venue map integrator 207, venue map GUI 201, or a combination thereof. Additional, different, or fewer acts may be provided. The acts are performed in the order shown or other orders. The acts may also be repeated. Certain acts may be skipped.

At act A110, one or more security requirements are identified for the asset. An asset may be any object, feature, or person that requires some level of security. Examples of assets includes furniture (desk, filing cabinet, etc.), electronic equipment (desktop computer, server, router, printer, etc.), maintenance equipment, or other objects or features. When a new asset is secured in the venue, a security requirement list may be created for the asset. Security requirements may include, for example, security settings for tangible and non-tangible security systems 209. The security requirement list may be created manually or automatically. In an embodiment, the security requirement list is generated automatically based on similar assets that exist in the venue. For example, the venue mapping system 200 may identify a new asset as similar to an existing asset (same type, model, company asset code) and use the existing asset's security requirements as a template for the new asset.

The security requirements for an asset may include different levels of security settings. For example, an asset may have a preferred security level for a security system and a minimum security level. The range of values may assist the system in finding an appropriate or optimal location for the asset. If, for example, multiple locations are found that meet the minimum-security level, the areas may be ranked based on how close the locations are to the preferred security level. Variable levels may also provide multiple options when placing multiple assets in a venue.

At act A120, a plurality of areas in a venue map are identified that satisfy at least one or more of the security requirements. The venue map may store data relating to one or more tangible or in-tangible security systems 209 or features. Security systems 209 and features may include camera surveillance systems, electronic locks further restricting access to secure areas, safety systems, wireless coverage, and others as described above.

The venue map database may communicate with security systems 209 using a venue map integrator 207. The venue map integrator 207 facilitates bi-directional communication between the venue map database 203 and security systems 209 installed at the venue. For example, a keycard system may be implemented at a venue. The keycard system may be configured to operate on its own separate from the venue map database 203. The venue map integrator 207 may allow the venue map database 203 to analyze the keycard system to identify locations and setting (e.g. access) for each of the objects controlled by the keycard system. The venue map integrator 207 may provide access the keycard system by the venue map database 203 to alter settings on the keycard system (e.g. granting or denying access for a person or group). The venue map integrator 207 may provide APIs for each of the security systems 209 to communicate with the venue map database 203. The venue map integrator 207 may provide a single protocol for communication between the venue map database 203 and any security systems 209. The venue map database 203 may include data for each of the security systems 209 and features. A venue map analyzer 205 may search the venue map database 203 to identify location that satisfy the security requirements.

At act A130, if an area is found that all security layers comply with the requirements, the area is displayed on a venue map GUI 201. The venue map GUI 201 is a visualization of a venue map (2D/3D). The venue map GUI 201 may include features for a user to select different views or options. For example, one or more layers may be displayed while others are made transparent or remain hidden. Overlays may provide a user information about the security settings for a location or an asset. The GUI may allow a user to manually change security settings or give permission for the venue map system to automatically make changes. The venue map GUI 201 may be updatable in real time as information is received or updated in the venue map database 203. The venue map GUI 201 may provide routing instructions or additional information for storage of an asset.

At act A140, if the venue mapping system 200 determines that none of the areas satisfy all of the one or more security requirements, the venue mapping system 200 may attempt to make changes automatically to the security systems 209. At act A150, when no areas are found that may be automatically adjustable, a notification may be presented to a user. Assets may include multiple different security requirements. When one or more of the security requirements are not met by one single area, the venue mapping system 200 may rectify (or attempt to rectify) the situation by altering the existing security settings.

Different areas may include different variable security settings. Two types of security setting include automatically adjustable and manually adjustable. Automatically adjustable setting may be controllable directly through the venue map integrator 207. Room access, environmental conditions, wireless settings, among others. Manually adjustable setting may include security features that must be manually moved or setup. Manually adjustable setting may include physical objects that may be moved. Certain security settings may require manual input from an operator to change. For example, certain access settings may be too sensitive to allow for the system to make the change automatically.

In acts A140 and A150, one or more security settings of an area of the plurality of areas are adjusted to satisfy the one or more security requirements. The adjustments may be generated automatically (such as adjusting Wi-Fi strength, thermostat settings, access permissions, watchman routes or alarm conditions (e.g. changing the timing on the alarms), as long as the system is authorized to perform such changes) or a user may be presented with the parameters that need to be changed in an area in order to comply with the requirement. The user may be provided with an option on the GUI to execute the changes. Once such changes, either automatic or manual, are performed, the method may review the requirements again and identify the ideal area(s) on the venue map GUI 201 (e.g. as in act A130 described above).

In an embodiment, the adjustments may be performed automatically as a function of a machine learnt (learned) algorithm. Data regarding the adjustments for different security settings and assets may be acquired over time by the venue mapping system 200. The venue mappings system 200 may be taught using a machine learning algorithm to learn to identify which adjustments may be made automatically and the level of adjustments. Initially, for example, the venue mapping system 200 may require manual input to adjust a security setting. After adjusting the security setting multiple times, the venue mapping system 200 may learn when to adjust the security setting automatically without user input in order to satisfy security requirements for an asset.

For act A150, the notification may include several options, for example 1) alter security requirements for the asset, 2) move or alter security requirement for other assets, and/or 3) provide a best fit scenario. At act A160, user input is received. User input may be, for example, an indication that the security setting has changed, or a command to change the security system (if permission or manual override is required).

In an embodiment, if an area is not found that satisfying all the security requirements, one or more areas may be identified that are the best available locations for storage. Based on the search results, the venue mapping system 200 may propose the best areas for safekeeping of the asset. For example, areas that are include security settings that are closest to the requirements or areas with the easiest to overcome non-compliance issues. Areas that are the easiest to overcome non-compliance issues may include settings that may be automatically adjusted without affecting other asset security requirements. Areas that are the hardest to overcome non-compliance issues may require manual intervention and/or movement of one or more existing assets.

In an embodiment, the security settings may be temporally adjusted to accommodate the asset. Because changing the security setting may lower the security for an area, the setting changes may be set to expire after a certain time period. The system may attempt to move or relocate the asset after the time period or at regular intervals in order to maximize the security level of an area.

In an embodiment, after a new asset is located, the system may analyze the venue for security issues. The system may attempt to optimize the security of the venue (e.g. move assets or change security settings) according to one or more predefined settings. The system may, for example, minimize Wi-Fi coverage to only those areas that require Wi-Fi. As new assets are added, and the coverage requirements change, the system may adjust the Wi-Fi strength to only provide coverage that is necessary.

In an embodiment, the security settings may have a range of operation from a less secure setting to a more secure setting. Security settings may be maxed out until the security setting are needed to be relaxed. When an asset is removed, the system may automatically reset the settings so that the highest possible setting is achieved. Alternatively, the system may be set for accessibility and may be automatically altered to raise security levels only when needed.

Figure 5:
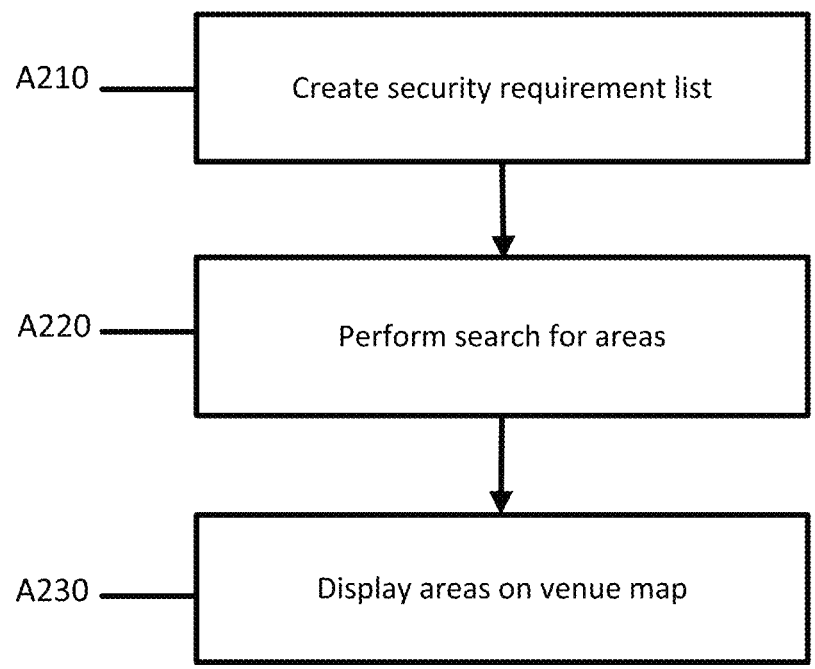
FIG. 5 depicts a workflow for providing areas for storage of an asset in a venue.

FIG. 5 depicts an example workflow for suggesting a location of an asset using the venue mapping system 200 of FIG. 2. As presented in the following sections, the acts may be performed using any combination of the components indicated in FIG. 2, FIG. 7, or FIG. 8. The following acts may be performed by the venue map analyzer 205, venue map integrator 207, venue map GUI 201, or a combination thereof. Additional, different, or fewer acts may be provided. The acts are performed in the order shown or other orders. The acts may also be repeated. Certain acts may be skipped.

At act A210, a security requirement list is created for the asset. An asset may be any object or feature that may be located or stored in a venue. The asset may be tangible or non-tangible. The asset may include one or more security requirements. The asset may be assigned the one or more security requirements by the venue mapping system 200 based on previous stored assets. The venue mapping system 200 may adjust or add security requirements. For example, a printer may include a base list of security requirements. The base list of security requirements may be augmented or changed depending on the type of venue, the country, company guidelines, or other factors. The security requirement list may include absolute values for security settings or may include variable settings. Setting may be combined using if/then statements. For example, an asset may include a security requirement that if the asset is located behind a secure door, the asset does not require coverage by a surveillance camera, however if the asset is located out in a more accessible area, the asset requires surveillance coverage.

At act A220, a search is performed for areas in a venue map that comply with the security requirements. A venue map database 203 may include security settings for location in a venue map. A venue map may include multiple predefined locations and/or may include location defined by a coordinate system. For example, the venue map may specify 100 predefined specifies locations (that may include coordinates) that will be searched. The venue map may search for a location pixel by pixel, voxel by voxel, by groups of pixels or voxels, by coordinates, or by other methods.

Any search algorithm may be used. In an embodiment, the search is performed efficiently, for example, by using a tree structure or other storage mechanism. The search may be performed using a machine learnt algorithm. The mapping system may learn which features or security data in the venue map database 203 should be searched first to narrow down the field.

The feature data or security data may be stored in the venue map in one or more security layers. The feature data or security data may be acquiring by accessing one or more security settings using an adapter/integrator that communicates and parses security systems 209 to identify locations and settings for the venue.

Areas may be scored on how compliant the areas are with the security requirements. A score may be used for ranking the areas. Components of the score may include whether or not a security requirement is met, whether the security settings for an area may be changed, the importance of a specific location (e.g. does the asset need to be close to other assets or personal), the type of security settings, among other factors. In an example, an area may be scored high if all but one of the security requirements are met and the uncompliant security setting may be adjusted. An area may be scored low if few of the security requirements are met and security is a priority for the asset (e.g. the asset requires high security rather than if the preference is for the asset to be placed in a high security area). Different scoring techniques may be used to score the areas. An area may be assigned two scores, for example, a first score for the area without any adjustments and a second score after adjustments. A user or operator may use the score for an area to select from different areas that are provided by the venue analyzer.

At act A230, the locations are displayed on the venue map. The locations may be displayed with information about the security levels. For example, when multiple locations are identified, the areas that include the highest security levels may be identified as such.

Figure 6:
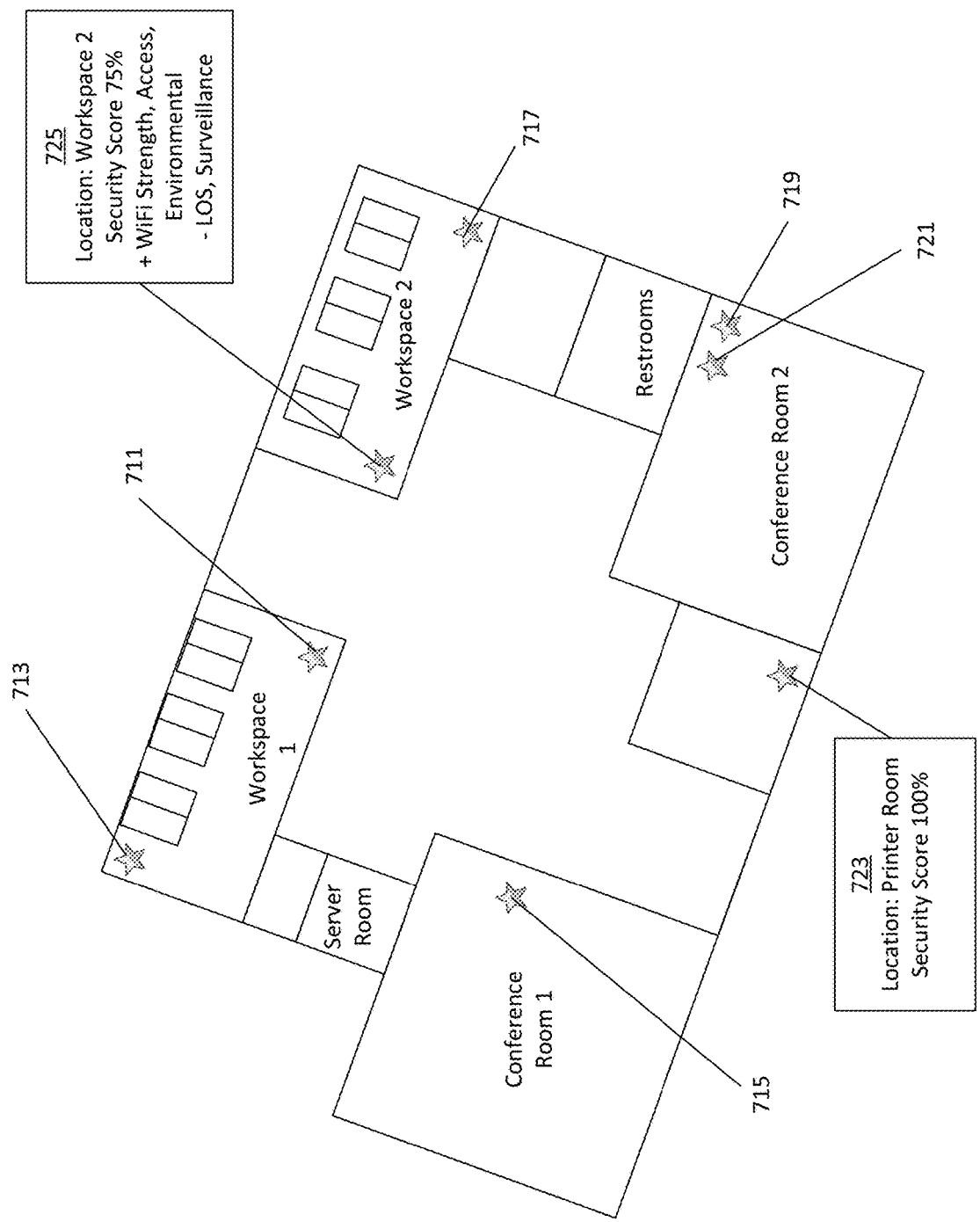
FIG. 6 depicts an example venue map with security information.
Figure 7:
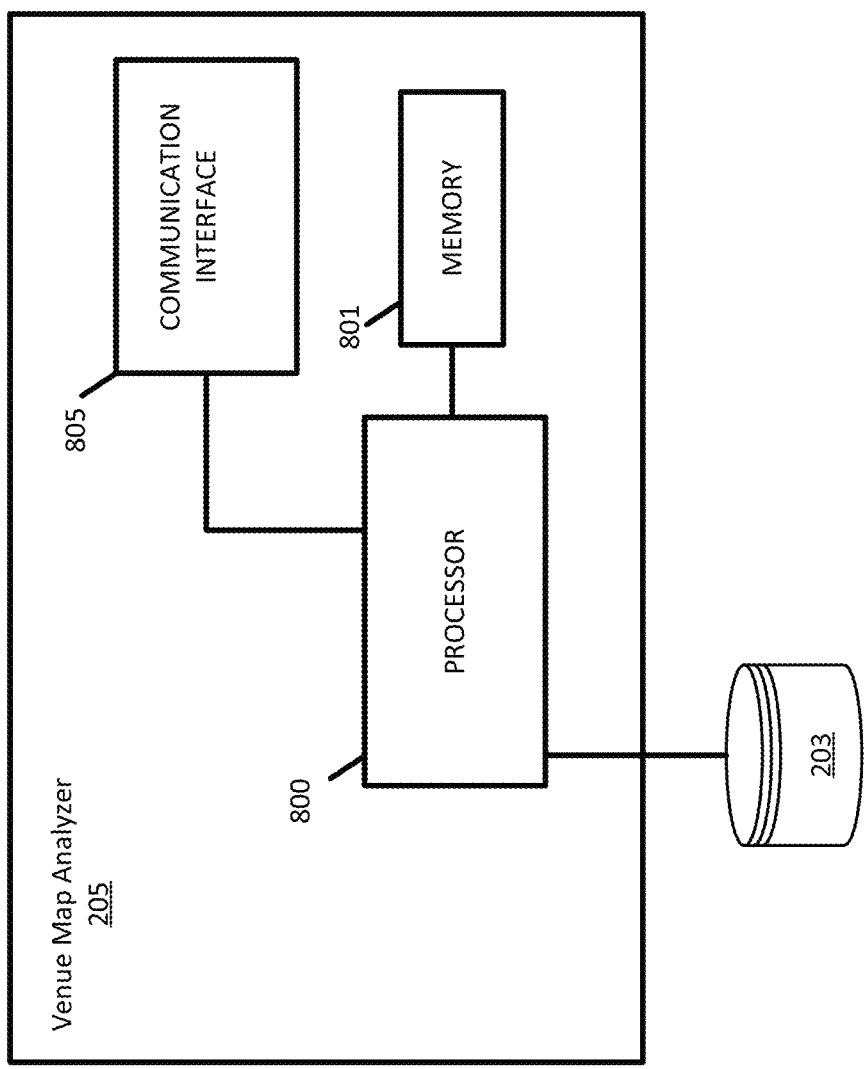
FIG. 7 depicts an example venue map analyzer of the system of FIG. 2.

FIG. 6 depicts example locations displayed on the venue map. FIG. 7 depicts eight possible locations 711, 713, 715, 717, 719, 721, 723, 725 for storage of an asset. Each location may be displayed with additional information (e.g. when selected or when a cursor moves over the location). For example, location 725 may score 90% for placement of the asset. Positives for the security score of location 725 are the Wi-Fi strength, access permissions, and the environmental setting. Negatives for the security score of location 725 are line of sight and surveillance. Contract location 723 is scored 100% indicating that the location 723 meets all security requirements for the asset. The venue map GUI 201 may provide different colors for different locations to indicate better or worse locations (less or more secure). The venue map GUI 201 may provide further options when selecting a location, for example, the ability to automatically or manually adjust one or more security settings.

FIG. 7 illustrates an example venue map analyzer 205 of the system of FIG. 2. The venue map analyzer 205 includes a processor 800 that is connected to a communications interface 805 and a memory 801. Additional, different, or fewer components may be included. The venue map analyzer 205 is configured to receive an asset security requirements list and identify one or more locations in a venue for storage of the asset that comply with the asset security requirements list. The venue map analyzer 205 may be configured to alter security settings of one or more security systems 209 using the venue map integrator 207.

The processor 800 is also connected to the geographic database 203. The communications interface 805 is configured to receive and transmit data from and to the venue map database 203, the venue map integrator 207, and the venue map GUI. The memory 801 is configured to store security data. The processor 800 is configured to analyze data from the venue map database 203 to identify one or more compliant areas. In an embodiment, the venue map GUI 201, the venue map database 203, the venue map integrator 207 are co-located. The processer 800 may process data for each component. The communications interface 805 may communicate data for each component. The memory 801 may store data for each component.

Figure 8:
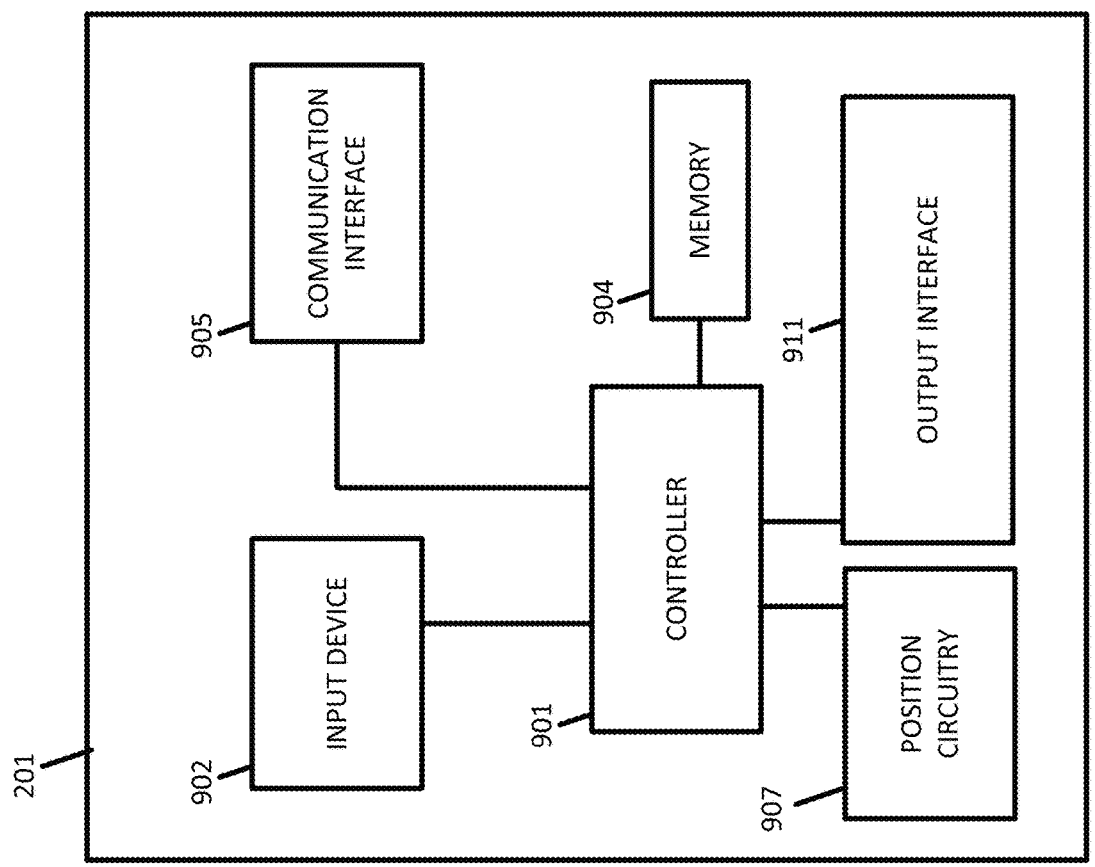
FIG. 8 depicts an example device for depicting a venue map graphical user interface of the system of FIG. 2.

FIG. 8 illustrates an example venue map GUI 201 of the system of FIG. 2. The venue map GUI 201 may be configured to collect, transmit, receive, process, or display data. The venue map GUI 201 includes a controller 901, a memory 904, an input device 902, a communication interface 905, position circuitry 907, and an output interface 911. Additional, different, or fewer components are possible for the venue map GUI 201. The venue map GUI 201 may be smart phone, a mobile phone, a personal digital assistant (PDA), a tablet computer, a notebook computer, a personal navigation device (PND), a portable navigation device, and/or any other known or later developed mobile device.

The processor 800/controller 901 may include a general processor, digital signal processor, an application specific integrated circuit (ASIC), field programmable gate array (FPGA), analog circuit, digital circuit, combinations thereof, or other now known or later developed processor. The processor 800/controller 901 may be a single device or combinations of devices, such as associated with a network, distributed processing, parallel processing, or cloud computing, or combinations therein.

The memory 801, 904 may be a volatile memory or a non-volatile memory. The memory 801, 904 may include one or more of a read only memory (ROM), random access memory (RAM), a flash memory, an electronic erasable program read only memory (EEPROM), or other type of memory. The memory 801, 904 may be removable from the venue map GUI 201, such as a secure digital (SD) memory card. The memory may contain a locally stored venue map database 203. The locally stored venue map database 203 may be a copy of the venue map database 203 or may include a smaller piece. The locally stored venue map database 203 may use the same formatting and scheme as the venue map database 203.

The positioning circuitry 907, which is an example of a positioning system, is configured to determine a location of the venue map GUI 201. The positioning circuitry 907 may include movement circuitry, which is an example a movement tracking system, is configured to determine movement of a venue map GUI 201. The position circuitry 907 and the movement circuitry may be separate systems, or segments of the same positioning or movement circuitry system. In an embodiment, components as described herein with respect to the venue map GUI 201 may be implemented as a static device. For example, such a device may not include positioning circuitry 907. The venue map GUI 201 may identify its position as the device move through a venue using the positional circuitry. For indoor spaces without GPS signals, the venue map GUI 201 may rely on other geolocations methods such as LIDAR, radar, Wi-Fi, beacons, landmark identification, inertial navigation (dead reckoning), among others.

The communications interface 805, 905 may include any operable connection. An operable connection may be one in which signals, physical communications, and/or logical communications may be sent and/or received. An operable connection may include a physical interface, an electrical interface, and/or a data interface. The communications interface 805, 905 provides for wireless and/or wired communications in any now known or later developed format. The communications interface 805, 905 may include a receiver/transmitter for digital radio signals or broadcast mediums.

The output interface 902 may be a liquid crystal display (LCD) panel, light emitting diode (LED) screen, thin film transistor screen, or another type of display. The output interface 902 may also include audio capabilities, or speakers. The output interface 902 may be configured to display a location for storage or placement of an asset.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, GPUs programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in the specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following embodiments are disclosed. Embodiment 1: a method for identifying an acceptable location for storing an asset, the method comprising: identifying, by a processor, one or more security requirements for the asset; identifying, by the processor, a plurality of locations in a venue map database that satisfy one or more of the security requirements; determining, by the processor, that none of the plurality of locations satisfy all of the one or more security requirements; adjusting, by the processor, one or more security settings of a location to satisfy the one or more security requirements; and indicating, by the processor, on a venue map graphical user interface, the location for storage of the asset.

Embodiment 2: the method of embodiment 1, wherein adjusting one or more security settings comprises: identifying, by the processor, the area of the plurality of areas that includes variable security settings; determining, by the processor, a change of variable security settings for the area that does not affect security requirements for other assets stored in the area; and implementing, by the processor, the change to the variable security settings of the area.

Embodiment 3: the method of embodiment 1, further comprising: determining, by the processor, the area with the easiest to overcome non-compliance issues.

Embodiment 4: the method of embodiment 1, wherein the venue map database comprises a plurality of security layers that include security settings for one or more features.

Embodiment 5: the method of embodiment 4, wherein the plurality of security layers comprises an access permissions layer, an alarm layer, an access control panels layer, a utilities layer, a surveillance layer, a regulatory layer, an environmental layer, or a wireless network connectivity later.

Embodiment 6: the method of embodiment 1, further comprising: interacting, by the processor, with a security system that controls the one or more security settings.

Embodiment 7: the method of embodiment 6, wherein the security system comprises a wireless network and adjusting comprises adjusting the strength of the wireless network.

Embodiment 8: the method of embodiment 6, wherein the security system comprises a camera surveillance system and adjusting comprises adjusting a field of view of one or more cameras in the area.

Embodiment 9: the method of embodiment 1, further comprising: communicating, by the processor, the one or more security settings to the security system using an application programming interface between the venue map database and the security system.

Embodiment 10: the method of embodiment 1, wherein indicating comprises displaying the location on a three-dimensional venue map.

Embodiment 11: a computer-readable, non-transitory medium storing a program that causes a computer to execute a method comprising: creating a security requirements list for an asset; searching for areas in a venue map that comply with the security requirements list; and displaying the areas for storage of the asset.

Embodiment 12: the computer-readable, non-transitory medium of embodiment 11, further comprising: altering, automatically, one or more security settings for an area to comply with the security requirements list when no areas are identified in the search.

Embodiment 13: the computer-readable, non-transitory medium of embodiment 11, further comprising: scoring the areas based on a level of compliance with the security requirements list, wherein the areas are displayed with the scores.

Embodiment 14: the computer-readable, non-transitory medium of embodiment 13, wherein scoring is further based on a difficulty for a security setting to overcome non-compliance through one or more changes to the security setting.

Embodiment 15: a system for identifying a location to store an asset, the system comprising: a graphical user interface configured to select an asset and a plurality of security settings for the asset; a venue map database configured to store security data and location data for a venue; and a venue map analyzer configured to search the database to identify locations in the venue for storage of the asset that comply with the plurality of security settings; wherein the graphical user interface is configured to display the locations on a venue map generated from the venue map database.

Embodiment 16, the system of embodiment 15, further comprising: a venue map integrator configured to receive data from one or more security systems and store the data in the database.

Embodiment 17, the system of embodiment 16, wherein the venue map analyzer is further configured to automatically adjust one or more security settings for the locations to comply with the plurality of security settings.

Embodiment 18, the system of embodiment 17, wherein the venue map analyzer is further configured to identify the locations that includes variable security settings, determine a change of variable security settings for the locations that does not affect security requirements for other assets stored in the locations, and implement the change to the variable security settings of the locations.

Embodiment 19, the system of embodiment 18, wherein the venue map database comprises a plurality of security layers that each include security settings for one or more features.

Embodiment 20, the system of embodiment 19, wherein the plurality of security layers comprises an access permissions layer, an alarm layer, an access control panels layer, a utilities layer, a surveillance layer, a regulatory layer, an environmental layer, or a wireless network connectivity later.

The invention claimed is:

1. A method for identifying a location for storing an asset, the method comprising:
   identifying, by a processor, one or more security requirements for the asset;
   identifying, by the processor, a plurality of locations in a venue map database that satisfy one or more of the security requirements;
   determining, by the processor, that none of the plurality of locations satisfy all of the one or more security requirements;
   adjusting, by the processor, one or more security settings of the location of the plurality of locations to satisfy the one or more security requirements; and
   indicating, by the processor, on a venue map graphical user interface, the location for storage of the asset.

2. The method of claim 1, wherein adjusting one or more security settings comprises:
   identifying, by the processor, the area of the plurality of areas that includes variable security settings;
   determining, by the processor, a change of variable security settings for the area that does not affect security requirements for other assets stored in the area; and
   implementing, by the processor, the change to the variable security settings of the area.

3. The method of claim 1, further comprising:
   determining, by the processor, the area with the easiest to overcome non-compliance issues.

4. The method of claim 1, wherein the venue map database comprises a plurality of security layers that include security settings for one or more features.

5. The method of claim 4, wherein the plurality of security layers comprises an access permissions layer, an alarm layer, an access control panels layer, a utilities layer, a surveillance layer, a regulatory layer, an environmental layer, or a wireless network connectivity layer.

6. The method of claim 1, further comprising:
   interacting, by the processor, with a security system that controls the one or more security settings.

7. The method of claim 6, wherein the security system comprises a wireless network and adjusting comprises adjusting the strength of the wireless network.

8. The method of claim 6, wherein the security system comprises a camera surveillance system and adjusting comprises adjusting a field of view of one or more cameras in the area.

9. The method of claim 1, further comprising:
   communicating, by the processor, the one or more security settings to the security system using an application programming interface between the venue map database and the security system.

10. The method of claim 1, wherein indicating comprises displaying the location on a three-dimensional venue map.

11. A computer-readable, non-transitory medium storing a program that causes a computer to execute a method comprising:
    creating a security requirements list for an asset;
    searching for areas in a venue map that comply with the security requirements list;
    altering one or more security settings for an area to comply with the security requirements list when no areas are identified in the search; and
    displaying the area for storage of the asset.

12. The computer-readable, non-transitory medium of claim 11, further comprising:
    scoring the areas based on a level of compliance with the security requirements list, wherein the areas are displayed with the scores.

13. The computer-readable, non-transitory medium of claim 12, wherein scoring is further based on a difficulty for a security setting to overcome non-compliance through one or more changes to the security setting.

14. A system for identifying a location to store an asset, the system comprising:
    a graphical user interface configured to select an asset and a plurality of security settings for the asset;
    a venue map database configured to store security data and location data for a venue; and
    a venue map analyzer configured to search the database to identify locations in the venue for storage of the asset that comply with the plurality of security settings and adjust one or more security settings for one or more locations to comply with the plurality of security settings;
    wherein the graphical user interface is configured to display the one or more locations on a venue map generated from the venue map database.

15. The system of claim 14, wherein the venue map analyzer is further configured to identify the locations that includes variable security settings, determine a change of variable security settings for the locations that does not affect security requirements for other assets stored in the locations, and implement the change to the variable security settings of the locations.

16. The system of claim 14, further comprising:
    a venue map integrator configured to receive data from one or more security systems and store the data in the database.

17. The system of claim 15, wherein the venue map database comprises a plurality of security layers that each include security settings for one or more features.

18. The system of claim 17, wherein the plurality of security layers comprises an access permissions layer, an alarm layer, an access control panels layer, a utilities layer, a surveillance layer, a regulatory layer, an environmental layer, or a wireless network connectivity layer.

* * * * *